(12) United States Patent
Naughton et al.

(10) Patent No.: US 10,264,098 B2
(45) Date of Patent: Apr. 16, 2019

(54) SERVICE ASSEMBLY AND DELIVERY (71) Applicant: Cisco Technology, Inc., San Jose, CA (US)

(72) Inventors: Brian Naughton, Reading (GB); Simon Osborne, Bletchingley (GB); Gareth Senior, Ascot (GB); Paul Kitteringham, Chesham (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 226 days.

(21) Appl. No.: 15/009,399

(22) Filed: Jan. 28, 2016

(65) Prior Publication Data

US 2016/0150051 A1    May 26, 2016

Related U.S. Application Data

(63) Continuation of application No. 12/517,259, filed as application No. PCT/GB2007/050714 on Nov. 26, 2007, now Pat. No. 9,258,370.

(30) Foreign Application Priority Data

Dec. 4, 2006    (GB) .................................. 0624168.1

(51) Int. Cl.
*G06F 15/16* (2006.01)
*H04L 29/08* (2006.01)
(Continued)

(52) U.S. Cl.
CPC ............ *H04L 67/327* (2013.01); *H04L 67/16* (2013.01); *H04L 67/32* (2013.01); *H04L 67/34* (2013.01);
(Continued)

(58) Field of Classification Search
CPC .............................. H04L 67/327; H04L 67/16
(Continued)

(56) References Cited

U.S. PATENT DOCUMENTS 8,060,864 B1 * 11/2011 Michelsen ............ G06F 9/4428
                                                          709/202
2002/0026630 A1 * 2/2002 Schmidt .................... G06F 8/20
                                                          717/103
(Continued)

OTHER PUBLICATIONS

U.S. Appl. No. 12/517,259, filed Jun. 2, 2009, Office Action, dated Dec. 28, 2010.
(Continued)

*Primary Examiner* — Karen C Tang
(74) *Attorney, Agent, or Firm* — Hickman Palermo; Becker Bingham LLP (57) ABSTRACT

A system for assembling and delivering a communications service or product is described which is flexible to accommodate the rapid introduction of new product/service offerings on a frequent basis. The method involves receiving data relating to a number of communication service components and creating and storing a data structure for each communication service component. Data is also received relating to a communication service, the data identifying at least one of the communication service components and a data structure for the communications service is created and stored. In response to receiving an input requesting provisioning of the communications service, an end-to-end process flow for delivering the communications service is automatically created based on the data structure for the communications service and the data structure for the identified communication service components.

20 Claims, 6 Drawing Sheets

(51) Int. Cl.
*H04M 3/42* (2006.01)
*H04Q 3/00* (2006.01)

(52) U.S. Cl.
CPC ...... *H04M 3/42136* (2013.01); *H04Q 3/0054* (2013.01)

(58) Field of Classification Search
USPC ........................................................ 709/217
See application file for complete search history.

(56) References Cited

U.S. PATENT DOCUMENTS

| | | | |
|---|---|---|---|
| 2002/0062475 A1 | 5/2002 | Iborra et al. | |
| 2002/0083166 A1* | 6/2002 | Dugan | H04M 15/90 709/223 |
| 2003/0063720 A1 | 4/2003 | Mallnowski et al. | |
| 2003/0093433 A1 | 5/2003 | Seaman et al. | |
| 2003/0200254 A1* | 10/2003 | Wei | G06F 9/4443 709/203 |
| 2003/0200526 A1* | 10/2003 | Arcand | G06F 9/465 717/102 |
| 2004/0111730 A1* | 6/2004 | Apte | G06F 9/548 719/330 |
| 2005/0021689 A1* | 1/2005 | Marvin | G06F 8/31 709/220 |
| 2005/0071818 A1 | 3/2005 | Reissman et al. | |
| 2005/0193029 A1 | 9/2005 | Rom et al. | |
| 2005/0193377 A1 | 9/2005 | Seto et al. | |
| 2006/0130056 A1* | 6/2006 | Bozak | G06F 8/61 717/174 |
| 2006/0178858 A1* | 8/2006 | Trowbridge | G06F 8/34 703/2 |
| 2008/0022281 A1* | 1/2008 | Dubhashi | G06F 9/547 718/102 |
| 2008/0077613 A1* | 3/2008 | Hay | G06F 17/2247 |
| 2008/0297847 A1* | 12/2008 | Yamazaki | G06F 17/50 358/1.15 |
| 2010/0037100 A1 | 2/2010 | Lopian | |

OTHER PUBLICATIONS

U.S. Appl. No. 12/517,259, filed Jun. 2, 2009, Office Action, dated Jun. 3, 2015.

U.S. Appl. No. 12/517,259, filed Jun. 2, 2009, Notice of Allowance, dated Sep. 30, 2015.

U.S. Appl. No. 12/517,259, filed Jun. 2, 2009, Final Office Action, dated Nov. 10, 2011.

Ku, "A Reuse-Driven Approach or Rapid -Telephone Service Creation", International Conference on Software Reuse, XX, 1, dated Nov. 1994.

\* cited by examiner

SERVICE ASSEMBLY AND DELIVERY

BENEFIT CLAIM

This application claims the benefit under 35 U.S.C. § 120 as a continuation of application Ser. No. 12/517,259, filed Jun. 2, 2009, which claims the benefit under 35 U.S.C. § 119(b) and 35 U.S.C. § 371 as a US national stage application based upon PCT international application PCT/GB07/50714, filed Nov. 26, 2007, which claims the benefit under 35 U.S.C. § 119(b) of United Kingdom application 0624168.1, filed on Dec. 4, 2006, the entire contents of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

BACKGROUND

In order to provide a new communications service or product to a customer, the product/service must first be validated and checked for feasibility. Any additional equipment must then be identified and installed before activation of the product/service on the target network. In addition to this, contracts must be issued and billing instigated to enable the service provider to obtain payment for the new communications service or product. This requires complex process coordination and typically multiple systems exist to manage the installation and day to day operation of required communications service/product building blocks.

Currently service providers offer a limited number of services/products however, with the deployment of new network technologies it is expected that a large number of new services will be enabled. With a substantially larger number of services to deal with, the current methods of service delivery which require an end to end view of the entire delivery process across all involved operational systems for each and every product and service variation and the creation of a bespoke workflow for each product offered to each customer, will be too expensive, labor intensive and inflexible.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A system for assembling and delivering a communications service or product is described which is flexible to accommodate the rapid introduction of new product/service offerings on a frequent basis. The method involves receiving data relating to a number of communication service components and creating and storing a data structure for each communication service component. Data is also received relating to a communication service, the data identifying at least one of the communication service components and a data structure for the communications service is created and stored. In response to receiving an input requesting provisioning of the communications service, an end-to-end process flow for delivering the communications service is automatically created based on the data structure for the communications service and the data structure for the identified communication service components.

A first aspect provides a method of assembling and delivering a communications service in a computer system, the method comprising: receiving data relating to a plurality of communication service components; creating and storing a data structure for each of the plurality of communication service components; receiving data relating to a communication service, the data identifying at least one of the plurality of communication service components; creating and storing a data structure for the communications service; receiving an input requesting delivery of the communications service; and automatically creating an end-to-end process flow for delivering the communications service based on said data structures.

The method may further comprise, prior to storing the data structure for the communications service: validating the data structure for the communications service based on the data structure for the identified at least one of the plurality of communications service components.

The input may comprise configuration data and the method may further comprise, prior to automatically creating an end-to-end process flow: validating the communications service based on the data structures and the configuration data.

Each data structure for a communication service component may comprise: component specification data and process fragment data.

The method may further comprise: outputting process fragments to an external system based on said data structures.

The method may further comprise: activating the communications service.

A second aspect provides a computer program comprising computer program code means adapted to perform all the steps of any of the methods described herein when said program is run on a computer. The computer program may be embodied on a computer readable medium.

A third aspect provides a system comprising: means for receiving data relating to a plurality of communication service components; means for creating a data structure for each of the plurality of communication service components; means for receiving data relating to a communication service, the data identifying at least one of the plurality of communication service components; means for creating a data structure for the communications service; a store for storing said data structures; an interface for receiving a request for delivery of the communications service; and means for automatically creating an end-to-end process flow for delivering the communications service in response to receiving said request, wherein the creation of said end-to-end process flow is based on said data structures.

Many of the attendant features will be more readily appreciated as the same becomes better understood by reference to the following detailed description considered in connection with the accompanying drawings. The preferred features may be combined as appropriate, as would be apparent to a skilled person, and may be combined with any of the aspects of the invention.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved.

A system for the assembly and delivery of a communications service or product is described below which is suitable for use in an environment where it is necessary to introduce new product/service offerings frequently. The system is flexible and enables automatic generation of the delivery processes and automatic update of the processes when components (e.g. service and product elements) change.

Figure 1:
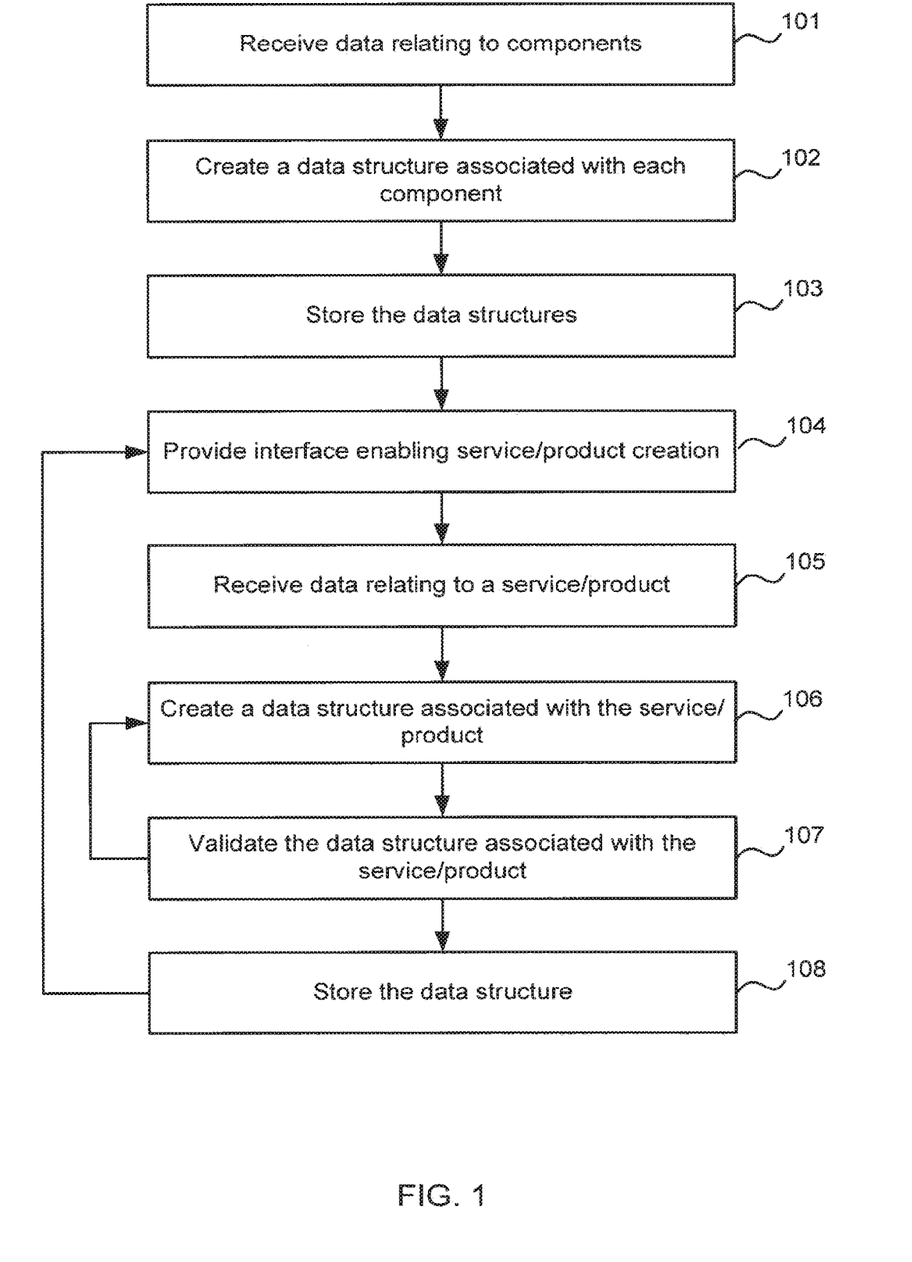
FIG. 1 shows a flow diagram of an example method of creating a communications service.
Figure 2:
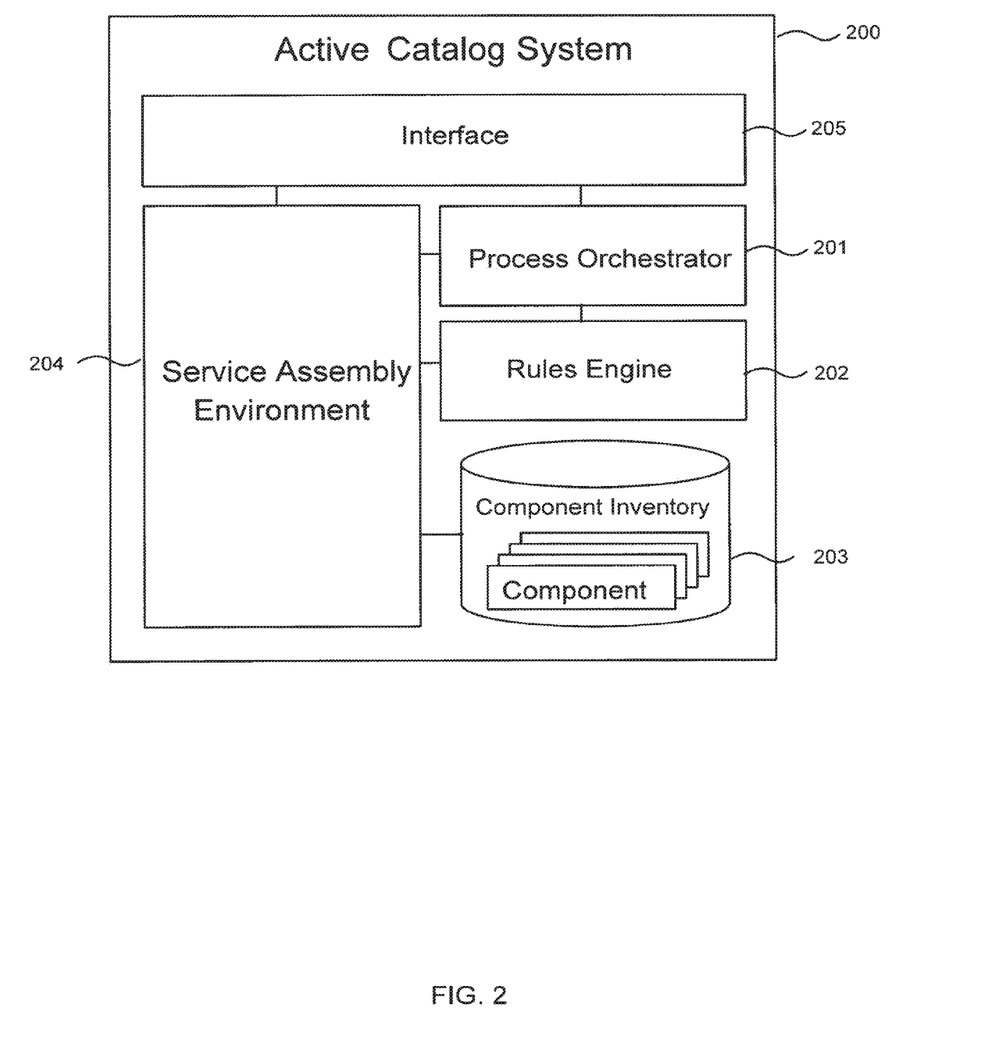
FIG. 2 shows a schematic diagram of a system for implementing the method of FIG. 1 and/or the method of FIG. 5.

FIG. 1 shows a flow diagram of an example method of creating a communications service. This method may be implemented in a system 200 as shown in FIG. 2 comprising a process orchestrator 201, a rules engine 202, a component inventory 203, a service assembly environment 204 and an interface 205.

The system receives data relating to one or more components (step 101). These components represent any physical, logical or task related element of a communications service (also referred to as a communication service building block), such as a elements of a network including hardware (routers, servers etc.), the logical services that run on the network (IP VPN, DSL, Ethernet etc.), software applications (VoIP, Voicemail, Video, IP TV etc.) and workforce tasks (schedule installation, site survey etc.). Components may be generic (e.g. representing a generic router type or role) or may be specific to a particular manufacturer (e.g. a Nortel voicemail server) or to a particular model.

The system may provide a framework for the data input (in step 101) and the data may be received via the service assembly environment 204 (e.g. having been manually input by an engineer) or via the interface 205 from outside the system 200 (e.g. from the component itself or from a remote user). Using this data received, a data structure is created for each component (step 102). In some examples, the data structure may be created by modifying an existing data structure (e.g. one that is already stored in the component inventory 203).

Figure 3:
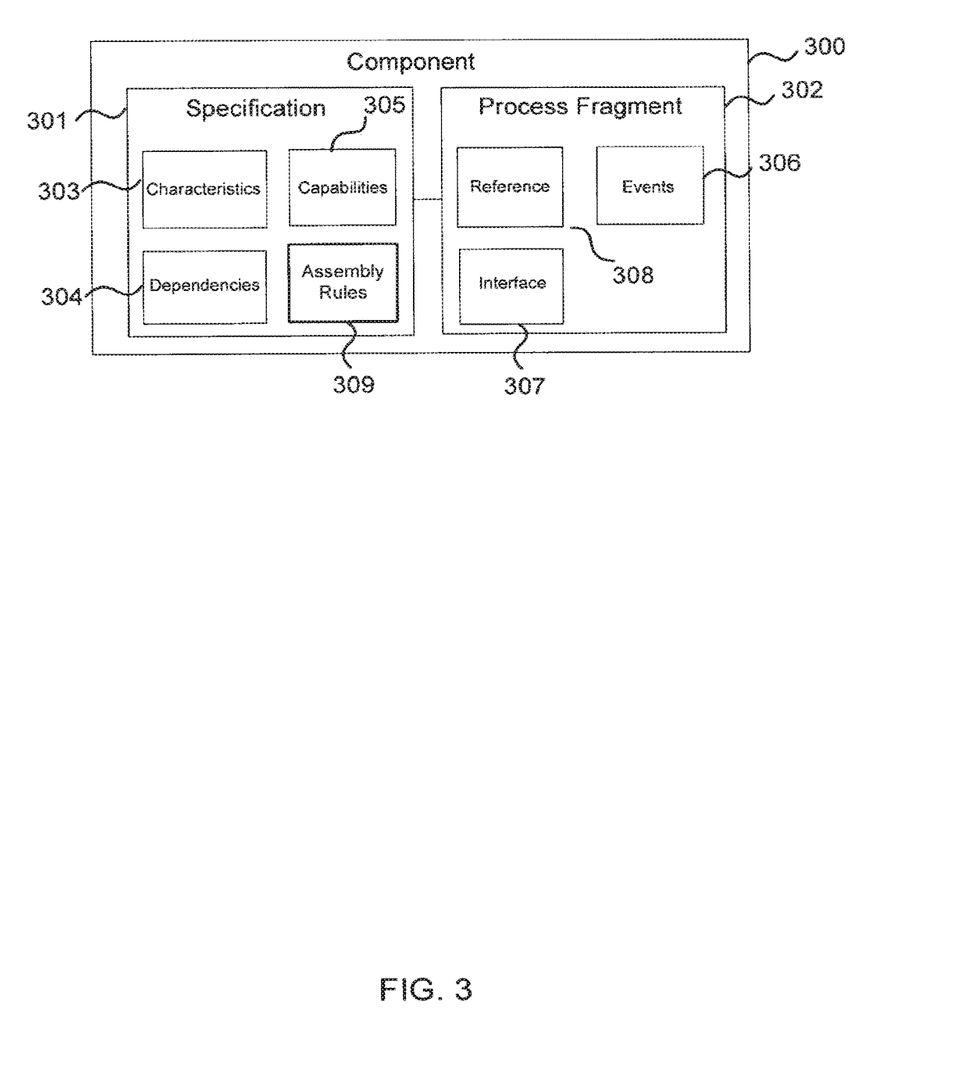
FIG. 3 shows a schematic diagram of a component data structure.

FIG. 3 shows a schematic diagram of a component data structure 300, which includes a specification of what the component is capable of delivering 301 and a reference to the process fragment in an external operational system that implements the specified capabilities 302.

The component specification data 301 includes a set of capabilities that the component can deliver 305 (also referred to as component capability data), a set of characteristics required to implement the capabilities 303 (also referred to as component characteristic data), dependency data 304, identifying other capabilities which are required for the component to be valid and a set of assembly rules 309 that map characteristics and capabilities to children component characteristics and capabilities.

The component capability data 305 represents a description of what features or functionality the modelled component is able to perform, e.g. a router is capable of supporting IP (Internet Protocol) services, a VPN (Virtual Private Network) is able to support quality of service and a Voice over IP (VoIP) application is capable of performing voicemail and call forwarding etc. These capabilities are used as the basis for compatibility and dependency rules as seen later.

The characteristic data 303 represents the information that needs to be captured to deliver a capability. A number of characteristics can be associated with a capability. For example, a characteristic can specify that an IP address must be specified before a router can be delivered, or a customer address must be specified before a site survey can be performed etc.

The dependency data 304 represents a set of component compatibility rules, i.e. inclusions and exclusions that specify what other capabilities must be in place for this component to function correctly or what capabilities cannot be in place for the component to function correctly. For example, a VoIP component is dependent on an IP VPN capability being in place, which in turn depends on a router being in place that supports IP VPN.

The assembly rules 309 include references to any children components of that component. Base components may be aggregated together (as described in more detail below) to create service offerings or products, and each aggregation of components is represented by its own component data structure. The aggregated component is referred to as a parent component whilst the constituent components are referred to as children (or child) components. For example, capabilities from a router component, a DSL component, and a VoIP component (the child components) can be selectively aggregated into a Voice offering or bundle that would be more familiar to the customer (the parent component). The aggregation may occur on multiple levels such that parent components may be further aggregated together (with other parent components and/or with base components) to define more complex components, services or products. This aggregation and implementation is described in more detail below. The assembly rules contained within a data structure for a service or product may include ranges or limits which define the options available to a customer when selecting a products or services (e.g. numbers of handsets etc.).

Whilst the parent component defines its own capabilities, characteristics and dependencies, the defined assembly rules 309 map these to those required by the children components to implement the selected child capabilities. These rules may comprise direct mappings, algorithms for computation of component characteristics and/or instructions detailing where component characteristics can be found.

For example:

| Characteristics for identified components | Mapping |
|---|---|
| Username | Map from service username to children components |
| Bandwidth | Sum of all required bandwidth for each application delivered |
| IP address | Obtain from external database |
| Password | Randomly generated string |

As described above, the component data structure also includes process fragment data 302 that represents a reference to the process that is executed in an external operational system to deliver a required set of component capabilities. These process fragments may relate to front office activities, operations, network management or any other external system. The process fragment data includes reference data 308 that gives an address that can be uniquely resolved to a system and a process within. Also included is an interface 307 that describes the expected data input parameters required to run the referenced process and event data 306 that describes the various events the referenced process fragment will produce to notify the system (referred to as the Active Catalog) of progress. These events represent the output parameters of the referenced process fragment.

Having generated the data structure for each component (in step 102), the data structures are stored (step 103), for example in component inventory 203. These stored data structures are generic and not specific to any particular network, application, or service for which they might be used. The data structures may be re-used in different combinations (e.g. through aggregation) to create different service and/or product offerings and each component need only have one data structure.

The system provides an interface which enables services and/or products to be assembled from components (step 104) e.g. services from base components and/or products from service components. This interface may allow components to be assembled into bundles by dragging and dropping icons representing components for which data structures have already been created (in step 102). Data is received relating to how base components (also referred to as network level components) are assembled into service components or service components into product components (step 105) and this data may be received via the service assembly environment 204 (e.g. as a result of the drag and drop operations by an engineer) or via the interface 205. The data received (in step 105) may identify a plurality of components associated with the service/product and using this information and the stored data structures for the identified child components, a data structure for the new service/product component is then created (step 106).

In the examples described above, components representing network or task related items may be bundled into components that represent communications service offerings that a customer would recognize and use, and in turn these communications service components may be assembled into components that represent commercial product offerings a customer would purchase and be billed for. However, in other examples, the component bundling may occur in a different manner.

Having been created, the component data structure is validated (step 107) to ensure that none of the dependencies of the child components are violated (e.g. using the rules engine 202). Where components are missing capabilities which are required or where other dependencies are not fulfilled, the data structure for the service may be amended or re-created (step 106), the system may propose potential candidate components that implement the required capabilities (or satisfy other dependencies) and the user may be free to select a specific component. In some examples, the system may prioritize candidate components from those, which are available and may automatically select a component such that all dependencies are fulfilled. The system may enable a user to choose to leave outstanding component dependencies, but these must be reconciled later by bundling with other components that implement the required capabilities. Once the validation phase (step 107) is complete, the data structure is stored (step 108) in the component inventory 203. As described above, further aggregation of components may occur (e.g. service components into product components) by repeating this process (steps 104-108) as required.

Valid components, i.e. components that have no outstanding dependencies, can be made available directly to customers; however components that do have outstanding dependencies still must be bundled with other components before they can be offered directly to a customer. This bundling may occur within the system (e.g. through further aggregation by repeating steps 104-108) or may occur within an external system, such as a customer facing system, e.g. one which is capable of feeding data into the system 200 via the interface 205. Where an external system requests a bundle of components to be delivered, this information is received (in step 105) and the data structure representing this bundle of components (created in step 106) is validated (step 107) as described above. This may enable a selection of components {which individually may be invalid but in combination are valid) to be delivered.

Figure 4:
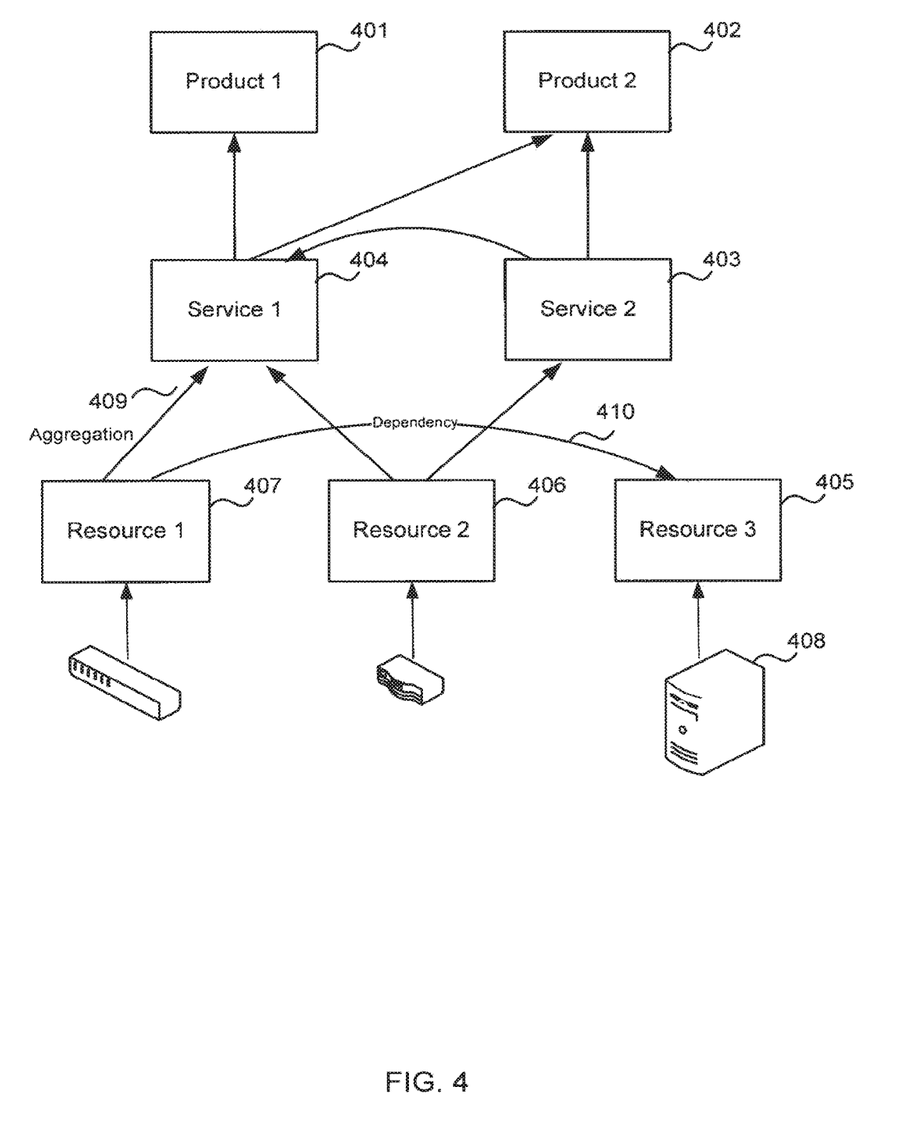
FIG. 4 shows a schematic diagram of assembled services and products.

FIG. 4 shows a schematic diagram of two products 401, 402 which may be offered to customers and how these are assembled from components that represent services 403, 404 and components that represent network elements 405-407 (also referred to as resources). These base components may correspond to network hardware 408. Representations of components may be re-used in representations of multiple services and representations of services may be re-used in representations of multiple products. Resources are aggregated into services (as shown by arrows 409 going between levels in the representation) whilst dependencies link elements within a level in the representation (e.g. arrow 410).

Figure 5:
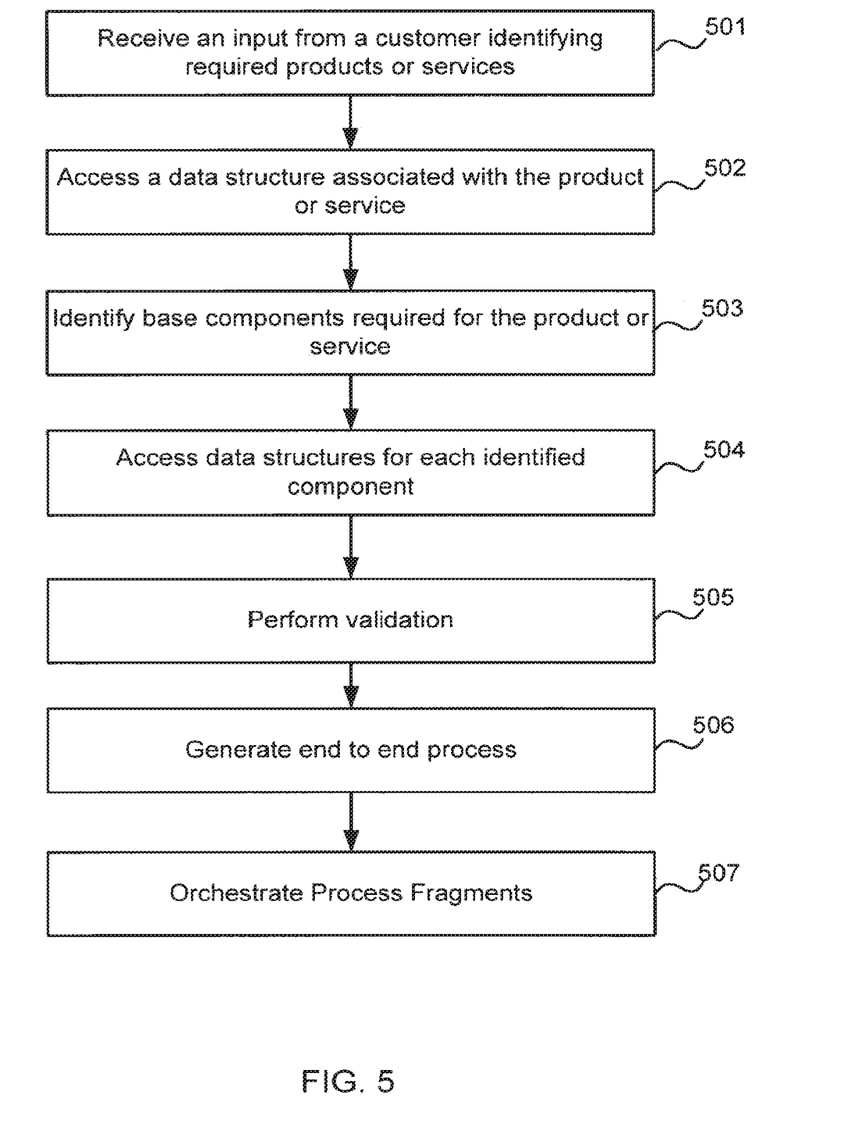
FIG. 5 shows a flow diagram of an example method of delivering a communications product or service.

Having generated one or more validated services and/or products as described above, these may be made available to customers and delivered when required. FIG. 5 shows a flow diagram of an example method of delivering a communications product or service. This method may also be implemented in the system 200 shown in FIG. 2. In response to receipt of an input from a customer identifying a required service or product (in step 501), a component data structure associated with the required service or product is accessed (step 502). The data may be received from the customer or an external system via the interface 205. A user interface may be provided by the system to enable product selection and to ensure that the required information is provided by a customer. In addition to identifying the service or product components required, the data received may also comprise additional information relating to the characteristics of the product or service such as parameters relating to the configuration of the service/product (e.g. number of handsets required) and customer information (e.g. customer name and address). This additional information may be referred to as configuration data.

From the accessed data structure, all of the children components for the required service/product component(s) can be identified (step 503) and the data structures for these components accessed (step 504) e.g. using the rules engine 202. In addition to identifying the required components from the accessed data structure (in step 503), the required numbers of each component may be determined from any additional information (e.g. configuration parameters) and dependencies 304 within the component data structures. For example, the configuration data may indicate that two telephone lines are required by the customer, this may trigger the requirement for two line card components and from the dependencies within the line card data structure, it may be determined that two instances of each of the handset and the ring tone components are required. The characteristics of parent components and any additional data may be mapped (as described above) according to the assembly rules 309 (by the rules engine 202) to determine characteristics of the identified components. This mapping may occur within any or all of steps 503-506.

Having accessed the data structures for all the required components, the requested service/product and any particular requested configuration is validated (step 505) based on the dependencies 304 and assembly rules 309 (e.g. using rules engine 202). In some examples, the number of components may be bounded by some limits that may reflect physical or service limitations. These rules may be attached to capabilities and also validated (in step 505). If validation is not successful, the system may provide feedback (e.g. to the customer or to a service/product provider) indicating that the request has failed. The feedback may provide suggestions for solutions, which would result in successful validation. In other examples, the validation process may automatically address any problems identified in order that validation is successful.

In the above example, the validation (step 505) was based on the requested products/services. In some examples, the validation may also take into consideration the services and components (e.g. network infrastructure) that the customer already has. Whilst in the example shown, the validation occurs after all the data structures have been accessed, in other examples, the validation may be performed at different stages in the method. For example, the validation may occur at several different stages of the method (e.g. after steps 502, 503 and 504).

Based on the accessed component data structures, all associated process fragments 302 needed to deliver each component are identified and the data required to drive each process fragment interface collected (in step 506). The process fragment interfaces 307 may then be output to an external system to initiate the process (step 507). The coordination of events 306 from process fragments 302 may be performed by the process orchestrator 201 such that they occur in the correct sequence.

The method described above with reference to FIG. 5 provides an automated creation of an end-to-end process whilst not requiring each process to be manually configured for a particular product offering or for a particular customer implementation.

If a network component offered changes (e.g. after initial product/service offerings have been created as shown in FIG. 1), for example because of a change in manufacturer or model, a new service component or product component can be created quickly by generating a data structure for the new component (as in steps 101-103). Existing data structures for services can then be amended (as in steps 105-108) to replace the old network component with the new network component, e.g. by dragging and dropping icons in a user interface. Any products offered will automatically be updated and when the service or product is next provisioned (as in FIG. 5), the new network component will automatically be identified (in step 503) and an updated process generated (in step 506) and initiated (step 507). Manual amendment of the end to end process (or workflow) or manual generation of a new end to end process each time such a change occurs is therefore avoided.

Whilst the above examples describe a two level hierarchy (components and services) or a three level hierarchy (components, services and products), in other examples, additional levels of hierarchy may be included (e.g. aggregation of products into product groupings).

Figure 6:
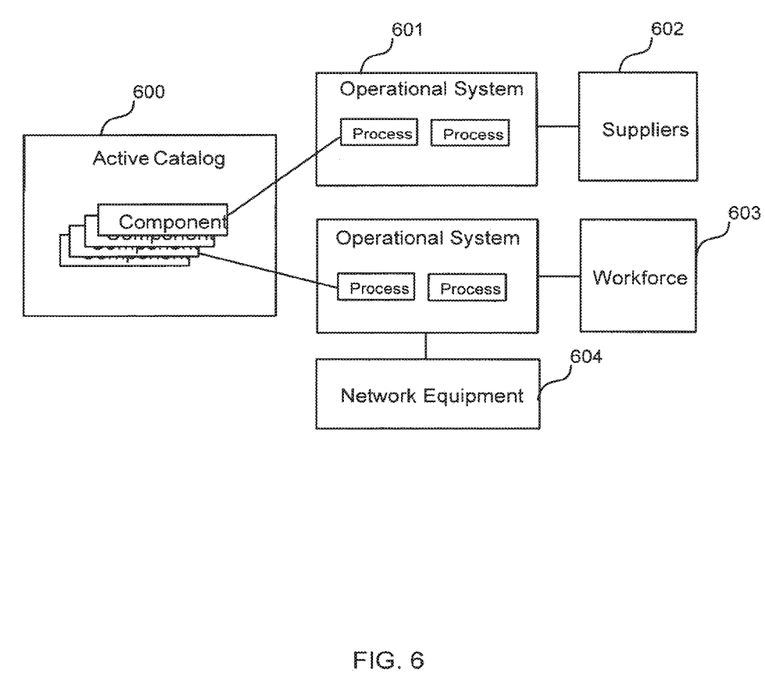
FIG. 6 shows a schematic diagram of an automatic assembly system integrated with other systems.

FIG. 6 shows a schematic diagram of an automatic assembly system 600 which implements the methods described above and which is integrated with other external systems 601 that manage network resource 604, workforce 603, and external supply chains 602. These external systems 601 receive the process fragment interfaces 307 which are output (in step 507).

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine-readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

The steps of the methods described herein may be carried out in any suitable order, or simultaneously where appropriate.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

What is claimed is:

1. A method for providing an improvement in assembling and delivering a communications service using a computer system, the method comprising:

creating and storing, at the computer system, a service data structure for the service and a plurality of component data structures for a plurality of hardware components that implement the service, the communications service comprising any of internet protocol (IP) telecommunications service, internet protocol virtual private networking (IP VPN), voice over internet protocol (VoIP), voicemail, video or internet protocol television (IP TV), the hardware components comprising any of routers, server computers or voicemail servers, the service data structure comprising data representing capabilities that the hardware component can deliver, characteristics required to implement the capabilities, dependency data, and assembly rules and process fragment data associated with hardware components that represents a reference to a process that is executed in a network management system to deliver the capabilities of the hardware component;

receiving, at the computer system, an input requesting a delivery of the communications service;

automatically delivering the communications service to the network management system based on the service data structure for the communications service and the plurality of component data structures for a plurality of components of the service, the automatically delivering comprising:

outputting respective process fragment data of each component data structure, of the plurality of component data structures, for a corresponding component to the network management system;

in response to outputting, causing the network management system to execute a particular process that the respective process fragment data describes, to deliver capabilities of the corresponding component at the network management system;

the particular process producing, at the network management system, one or more events in a sequence of a delivery of the capabilities of said each component;

receiving, at the computer system, notifications of the one or more events from the network management system;

in response to receiving notifications, activating the service at the network management system;

wherein the method is performed by one or more computing devices.

2. The method of claim 1, further comprising:
identifying the service data structure based on the input; and
identifying the plurality of component data structures based on assembly rules and dependency data of the service data structure and dependency data of one or more component data structures identified based on the dependency data of the service data structure.

3. The method of claim 1, further comprising, prior to automatically delivering the service to the network management system, validating the service based on the service data structure and the plurality of component data structures.

4. The method of claim 1, wherein the plurality of component data structures for the plurality of components include capabilities data describing capabilities that are required for the service to function correctly and that are included in dependency data of the service data structure of the service.

5. The method of claim 1, wherein said each component data structure includes capabilities data describing capabilities that are required for the corresponding component to function correctly and that are included in dependency data of one or more component data structures, of the plurality of component data structures other than said each component data structure, corresponding to one or more components of the plurality of components other than the corresponding component.

6. The method of claim 1, wherein the respective process fragment data includes reference data that represents an address of the network management system and/or the particular process on the network management system, and an interface that describes input parameters to run the particular process.

7. The method of claim 1, wherein the one or more events are described in event data of the respective process fragment data.

8. The method of claim 1 further comprising, based on the one or more events, determining, at the computer system, progress for delivering the capabilities of the corresponding component to the network management system.

9. The method of claim 1, wherein one or more of the plurality of components are network hardware components.

10. The method of claim 1, wherein the service is a communication network service.

11. One or more non-transitory storage media storing instructions which, when executed by one or more computing devices, cause performing a method for providing an improvement in assembling and delivering a communications service using a computer system, the method comprising:

creating and storing, at the computer system, a service data structure for the service and a plurality of component data structures for a plurality of hardware components that implement the service, the communications service comprising any of internet protocol (IP) telecommunications service, internet protocol virtual private networking (IP VPN), voice over internet protocol (VoIP), voicemail, video or internet protocol television (IP TV), the hardware components comprising any of routers, server computers or voicemail servers, the service data structure comprising data representing capabilities that the hardware component can deliver, characteristics required to implement the capabilities, dependency data, and assembly rules and process fragment data associated with hardware components that represents a reference to a process that is executed in a network management system to deliver the capabilities of the hardware component;

receiving, at the computer system, an input requesting a delivery of the communications service;

automatically delivering the communications service to the network management system based on the service data structure for the communications service and the plurality of component data structures for a plurality of components of the service, the automatically delivering comprising:

outputting respective process fragment data of each component data structure, of the plurality of component data structures, for a corresponding component to the network management system;

in response to outputting, causing the network management system to execute a particular process that the respective process fragment data describes, to deliver capabilities of the corresponding component at the network management system;

the particular process producing, at the network management system, one or more events in a sequence of a delivery of the capabilities of said each component;

receiving, at the computer system, notifications of the one or more events from the network management system;

in response to receiving notifications, activating the service at the network management system.

12. The one or more non-transitory storage media of claim 11, storing instructions which further cause performing:

identifying the service data structure based on the input; and identifying the plurality of component data structures based on assembly rules and dependency data of the service data structure and dependency data of one or more component data structures identified based on the dependency data of the service data structure.

13. The one or more non-transitory storage media of claim 11, storing instructions which further cause performing, prior to automatically delivering the service to the network management system, validating the service based on the service data structure and the plurality of component data structures.

14. The one or more non-transitory storage media of claim 11, wherein the plurality of component data structures for the plurality of components include capabilities data describing capabilities that are required for the service to function correctly and that are included in dependency data of the service data structure of the service.

15. The one or more non-transitory storage media of claim 11, wherein said each component data structure includes capabilities data describing capabilities that are required for the corresponding component to function correctly and that are included in dependency data of one or more component data structures, of the plurality of component data structures other than said each component data structure, corresponding to one or more components of the plurality of components other than the corresponding component.

16. The one or more non-transitory storage media of claim 11, wherein the respective process fragment data includes reference data that represents an address of the network management system and/or the particular process on the network management system, and an interface that describes input parameters to run the particular process.

17. The one or more non-transitory storage media of claim 11, wherein the one or more events are described in event data of the respective process fragment data.

18. The one or more non-transitory storage media of claim 11, storing instructions which further cause performing, based on the one or more events, determining, at the computer system, progress for delivering the capabilities of the corresponding component to the network management system.

19. The one or more non-transitory storage media of claim 11, wherein one or more of the plurality of components are network hardware components.

20. The one or more non-transitory storage media of claim 11, wherein the service is a communication network service.

* * * * *